United States Patent
Scholz et al.

(10) Patent No.: US 6,926,353 B2
(45) Date of Patent: Aug. 9, 2005

(54) REMOVABLE ROOF FOR A MOTOR VEHICLE

(75) Inventors: Andre Scholz, Wiernsheim (DE); Reiner Armbruster, Muehlacker (DE); Wolfgang Braun, Ebersbach (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/788,252

(22) Filed: Feb. 27, 2004

(65) Prior Publication Data
US 2004/0232736 A1 Nov. 25, 2004

(30) Foreign Application Priority Data
Feb. 28, 2003 (DE) .......................................... 103 08 769

(51) Int. Cl.[7] ................................................. B60J 7/11
(52) U.S. Cl. ......................... 296/218; 296/207; 16/86 R
(58) Field of Search ................................ 296/218, 207; 16/86 R, 86 A

(56) References Cited

U.S. PATENT DOCUMENTS 3,712,665 A * 1/1973 Klein .......................... 296/218
4,653,968 A * 3/1987 Rapata et al. ................ 411/247
4,664,436 A   5/1987 Eyb
6,119,306 A * 9/2000 Antonucci et al. .......... 16/86 A
6,507,976 B2 * 1/2003 Ichimaru ....................... 16/82

FOREIGN PATENT DOCUMENTS

| DE | 3413379 A1 | 10/1985 |
| DE | 4137344 A1 | 6/1992 |
| DE | 9406435.0 | 7/1994 |
| FR | 2629543 | * 10/1989 |

* cited by examiner

Primary Examiner—Dennis H. Pedder
(74) Attorney, Agent, or Firm—Crowell & Moring LLP

(57) ABSTRACT

This removable roof, which is suited for a motor vehicle such as a passenger car, overarches a passenger space in a body of the passenger car and is held on fixed body structures of the body. The roof is provided with at least one locking device, is made of dimensionally rigid material, and includes two roof elements assembled in a median longitudinal plane of the passenger car. For optimization of the roof, each roof element has a locking apparatus and cooperates with a bracing apparatus which counteracts moments on a bracing apparatus lying on one of the fixed body structures, such as a roll bar device, upon actuation of a locking part of the locking apparatus to which a boundary wall of the roof element running adjacent to the locking apparatus is exposed.

20 Claims, 4 Drawing Sheets

REMOVABLE ROOF FOR A MOTOR VEHICLE

Cross-reference to commonly assigned U.S. patent application Ser. No. 10/787,250, tilted LOCK FOR A REMOVABLE ROOF, filed Feb. 27, 2004, Ser. No. 10/788,251, titled LOCKING DEVICE FOR A REMOVABLE TOP, filed Feb. 27, 2004, and Ser. No. 10/787,249, titled REMOVABLE ROOF FOR A MOTOR VEHICLE, filed Feb. 27, 2004, is hereby made.

This application claims the priority of German application 103 08 769.9, filed Feb. 28, 2003, the disclosure of which is expressly incorporated by reference herein.

BACKGROUND AND SUMMARY OF THE INVENTION

The present invention relates to a removable roof for a motor vehicle, especially for a passenger car, which overarches a passenger space in a body of the passenger car and is held on fixed body structures of the body, the roof being made of dimensionally rigid material.

A removable roof known from German document DE 41 37 344 A1 is made of dimensionally stiff material and overarches a passenger space between a windshield frame and a roll bar which surrounds the passenger space transversely in relation to the longitudinal direction of the vehicle. A retaining apparatus is in operation adjacent to the windshield frame and reaches behind a second hook element on the windshield frame with a first hook element of the roof. In contrast, a locking apparatus is installed on the roof, where it borders on the roll bar, which engages into a hook of the roll bar with a catch of the roof.

An otherwise removable roof for a motor vehicle, apparent from German document DE 94 06 435 U1, can be inserted between a windshield frame and a roll bar. This roof is formed by two roof elements that are assembled in a median longitudinal plane of the motor vehicle. Both roof elements are held in position through the mediation of one identical lock on the windshield frame and the roll bar, respectively.

A latching device for a folding hood for a passenger car, disclosed by German document DE 34 13 379, has a crank-like latching part on the folding hood and includes a type of connecting link guide on a windshield frame. The latching part can be swiveled about an axis running in the longitudinal direction of the vehicle, and the connecting link guide is oriented transversely to the longitudinal direction of the vehicle.

It is an object of the invention to create a removable roof for a passenger car with two roof elements held in place with interposition of at least one locking apparatus on a body of the passenger car that is simple, true to function, and secure.

This object is accomplished in accordance with the invention through a locking apparatus provided for each roof element, and a bracing device with which each roof element cooperates, with the bracing device, lying on a fixed body structure, counteracting forces upon actuation of a locking part of the locking apparatus to which a boundary wall of the roof element running adjacent to the locking apparatus is exposed. Additional features of the invention are reflected in the dependent claims.

Advantages attained with the invention include the advantage that each roof element is provided with a locking apparatus, and accordingly handling, that is, releasing or positioning the roof element, is possible with only one locking apparatus. In order to be able to use a locking device that contains a crank-like locking part and a connecting link guide, a provision is made for a bracing apparatus that advantageously counteracts moments that arise in activating the locking apparatus on a boundary wall of the roof element running adjacent to the locking apparatus. The function of the bracing device is supported by the fact that (viewed transversely in relation to the vehicle) bracing elements constructed in the manner of buffers of the aforementioned bracing apparatus are provided on both sides of the locking apparatus. The bracing elements can be easily manufactured, since they are made of plastic, and are advantageously constructed because they are arranged on the roof element. Finally, the holders of the bracing element are components that can be repositioned without difficulty, and any possible manufacturing tolerances can be equalized in a defined manner thanks to the adjustability of the bracing element.

BRIEF DESCRIPTION OF THE DRAWINGS

One embodiment of the invention which will be described in greater detail below is illustrated in the drawings.

DETAILED DESCRIPTION OF THE INVENTION

Figure 1:
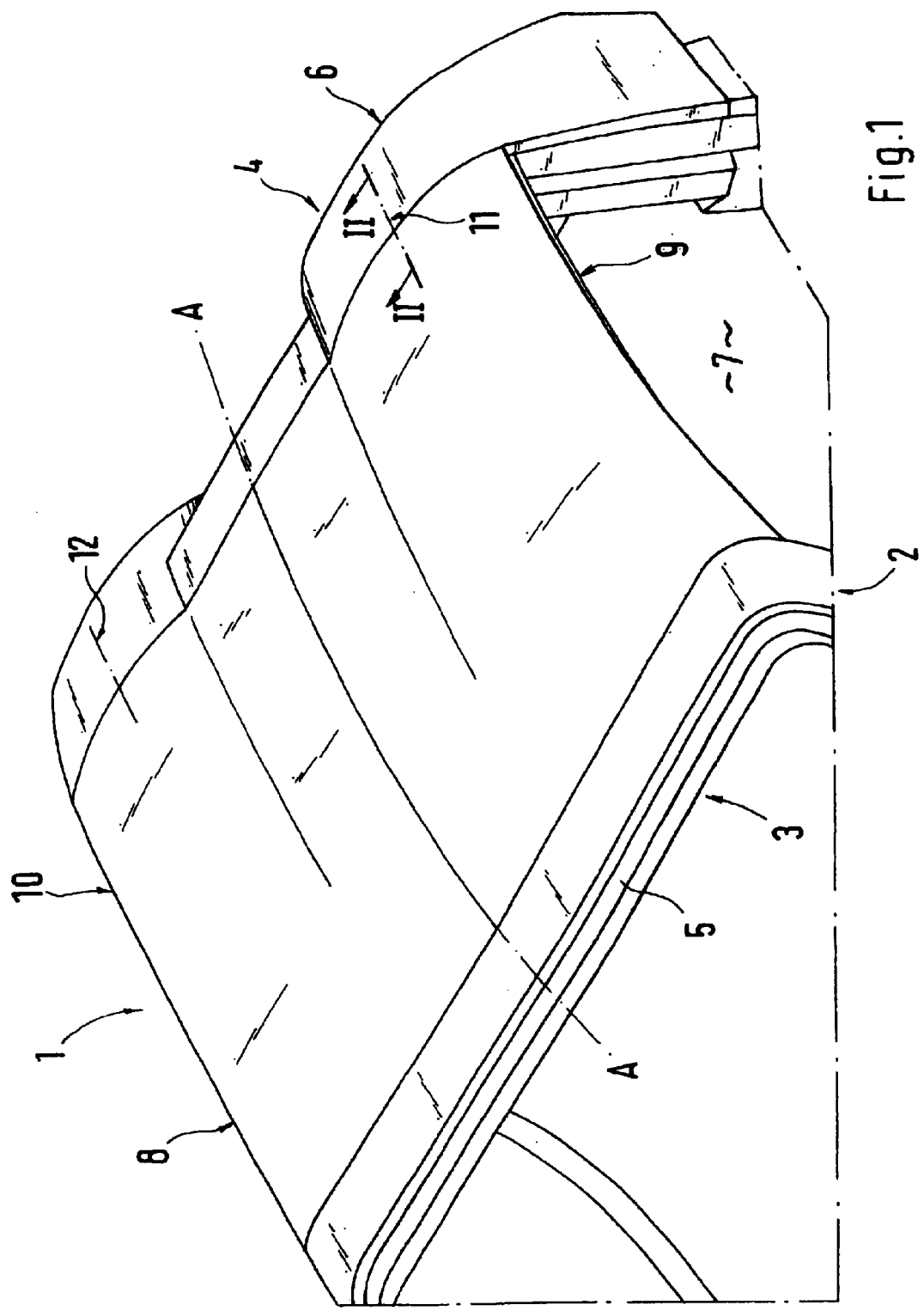
FIG. 1 is a partial angular view from the upper left front of a passenger car with a roof according to the invention.
Figure 2:
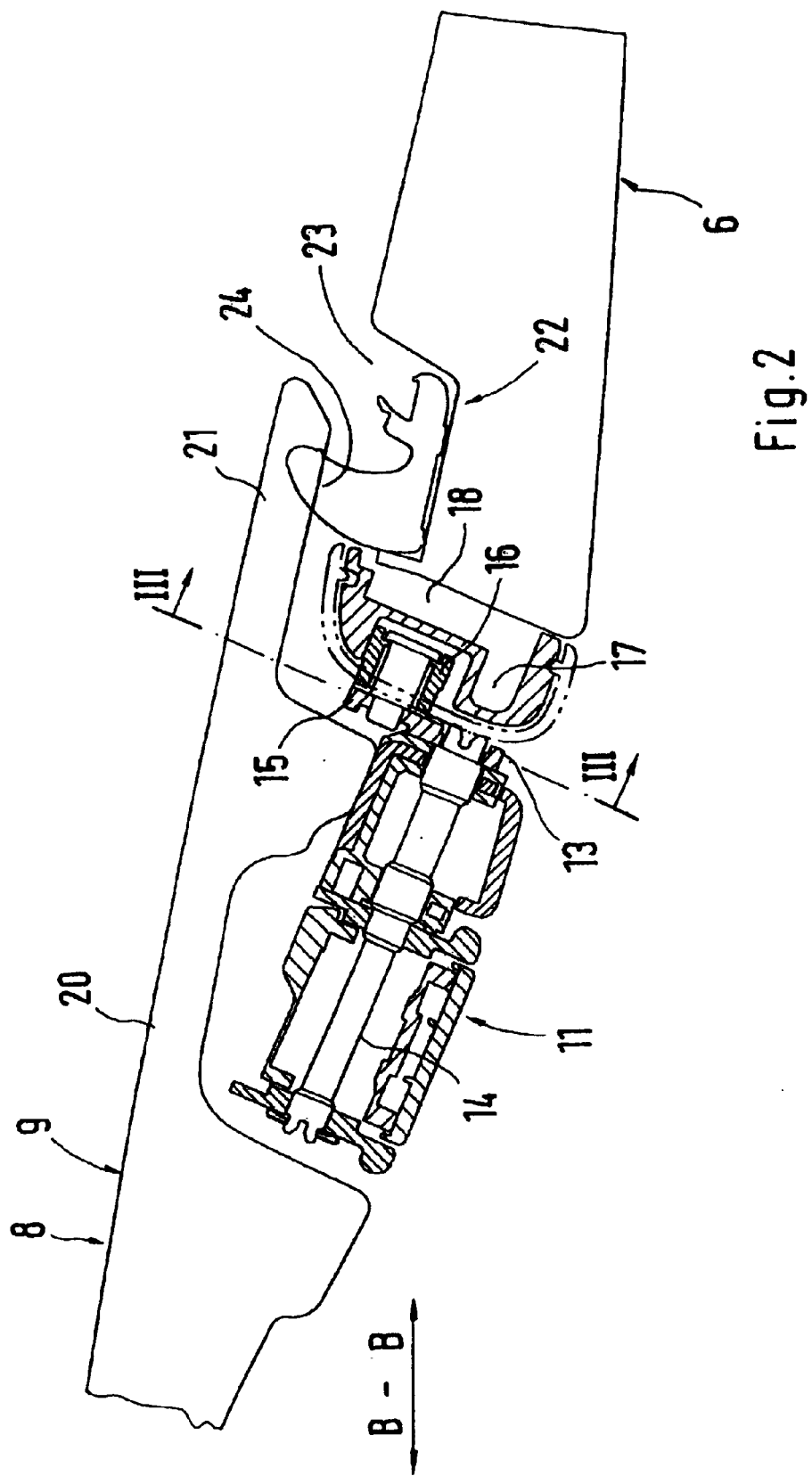
FIG. 2 is a sectional view along line II—II of FIG. 1.

A passenger car 1 of the sports car type-dynamically striking styling and demanding motor performance-includes a body 2 with fixed body structures 3 and 4. Body structure 3 is a windshield frame 5 and body structure 4 is a roll bar device 6. A passenger space 7 of the body 2 is overarched by a removable roof 8 that extends between the windshield frame 5 and the roll bar device 6. The roof 8 is formed by two roof elements 9 and 10 made of, for example, highly refractory materials (fiber-reinforced plastic) that are assembled in a median longitudinal plane A—A of the passenger car and are held in position at least on the roll bar device 6 by way of locking apparatuses 11 and 12.

Each locking apparatus, for example the apparatus 11, possesses a crank-like locking part 13 on the roof element 9 that can be swiveled about a bearing shaft 14 and engages into a connecting link guide 17 of a bearing plate 18 on the roll bar device 6 with a closing or locking lug 16 installed on a crank 15. A locking apparatus of this type is comprehensively described in German document DE 34 13 379 cited above.

Figure 3:
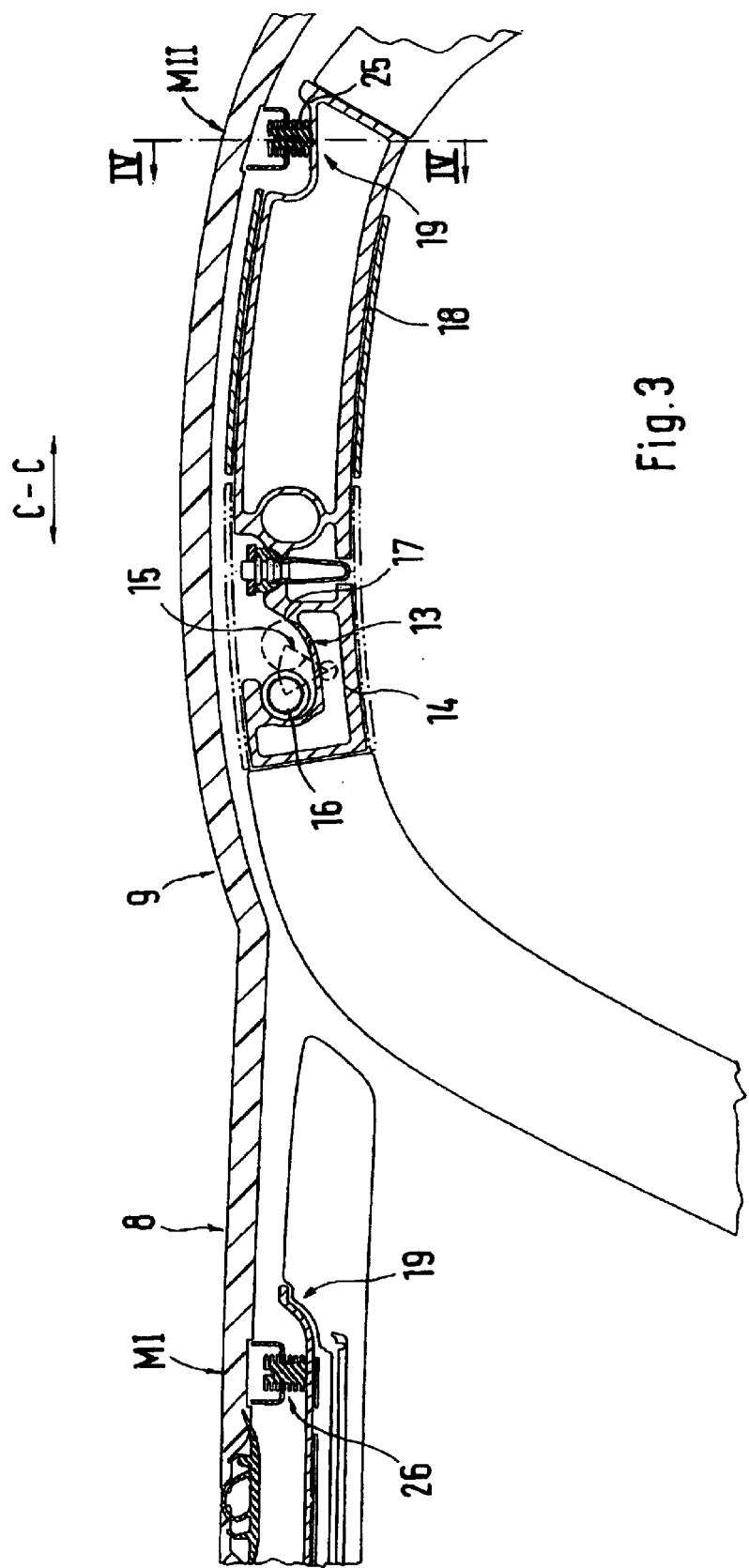
FIG. 3 is a sectional view along line III—III of FIG. 2.

The roof element 9 is merely provided with a single locking apparatus 11 and functions with a bracing apparatus 19 that lies on the roll bar device 6 and counteracts moments MI and MII—FIG. 3—upon actuation (opening and closing) of the locking apparatus 11. A boundary wall 20 or a flange-like roof segment 21 of the roof element 9 running adjacent to the locking apparatus 11 is exposed to these moments MI and MII. The roof segment 21 projects over a roll bar segment 22 with a trough 23 of the roll bar device 6. A sealing element 24 rests in the trough 23 on which the roof segment 21 lies. Bracing elements 25 and 26 of the bracing device 19 are provided on both sides of the locking apparatus 11 or the locking lug 16 in transverse direction of the vehicle C—C. The bracing elements 25 and 26 are constructed in the manner of buffers and are made of elastic material or plastic.

Figure 4:
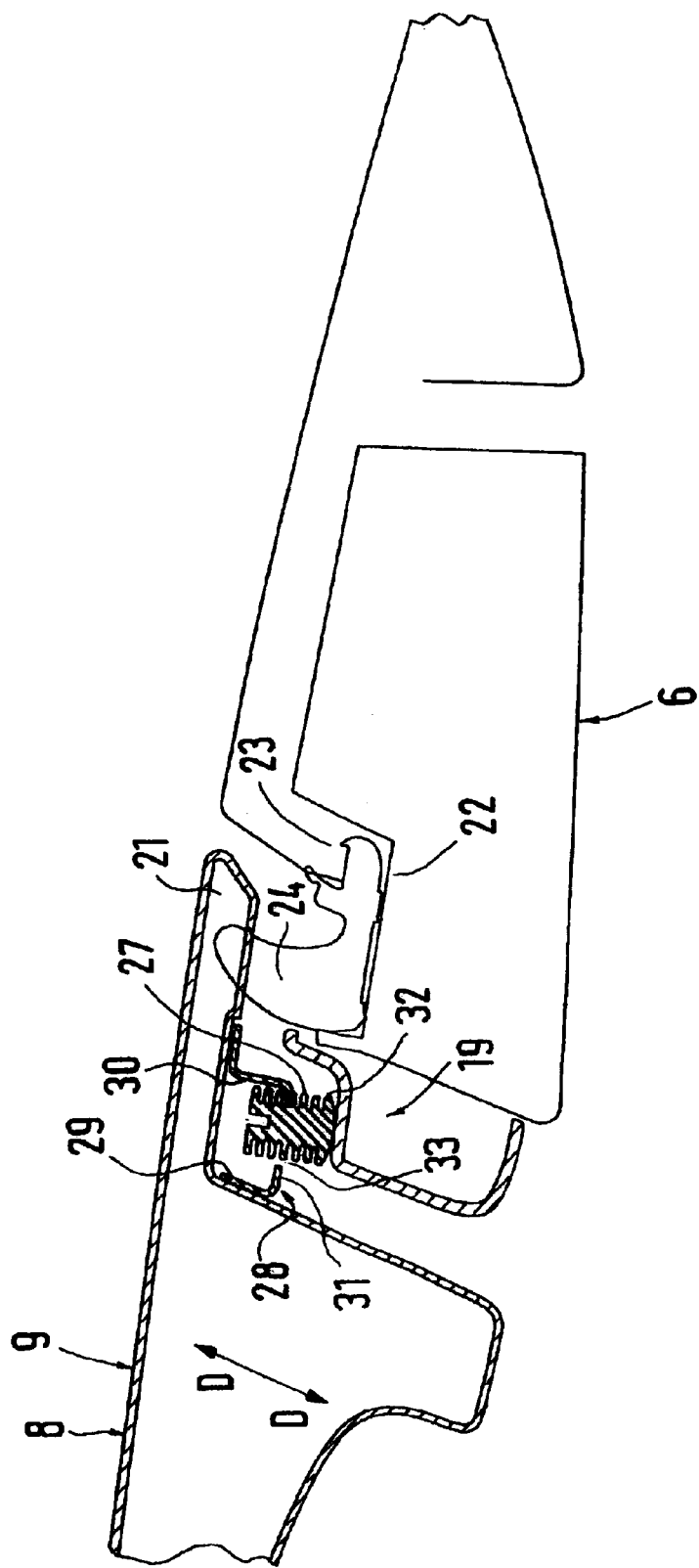
FIG. 4 is a sectional view along line IV—IV of FIG. 3.

Although it is conceivable to install the bracing elements 25 and 26 on the roll bar device 6, the aforementioned bracing elements are fastened on the roof element 9 in the illustrated design. Here each bracing element is adjustable in an axial direction D—D (FIG. 4); for example, the element 25 is constructed similar to a cylindrical bolt 27 whereby the bolt is fastened on a holder 28. The holder 28 has a U-shaped cross section whose segments 29 and 30 are fastened on the roof element 9, for example, by gluing. A bar 31 runs between segments 29 and 30 that bears the bolt 27. For this, the bolt 27 has a thread 32 on its exterior through which the bolt 27 is screwed into a bore hole 33 in the bar 31.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A removable roof for a passenger car, which overarches a passenger space in a body of the passenger car and is held on fixed body structures of the body, the roof being made of dimensionally rigid material and comprising:

two roof elements assembled in a median longitudinal plane of the passenger car, a locking apparatus provided for each roof element, and a bracing device with which each roof element cooperates, wherein the bracing device, lying on a fixed body structure, counteracts moments upon actuation in opening and closing directions of a locking part of the locking apparatus to which a boundary wall of the roof element running adjacent to the locking apparatus is exposed, and wherein the bracing device includes bracing elements provided on both sides of the locking apparatus viewed in a direction transverse to the vehicle.

2. The removable roof according to claim 1, wherein the bracing elements are constructed as buffers.

3. The removable roof according to claim 2, wherein the bracing elements are made of one of elastic material and plastic.

4. The removable roof according to claim 1, wherein the bracing elements are held on the roof elements.

5. The removable roof according to claim 4, wherein each bracing element is constructed as a bolt and is fastened on a holder of one of the roof elements.

6. The removable roof according to claim 5, wherein the holder on which the bolt is fastened has a U-shaped cross section with segments which are held on the one of the roof elements.

7. The removable roof according to claim 6, wherein a bar of the U-shaped cross section of the holder accommodates the bolt.

8. The removable roof according to claim 5, wherein the bolt is adjustable in an axial direction.

9. The removable roof according to claim 7, wherein the bolt includes a type of thread on its exterior by which the bolt can be screwed into a bore hole in the bar of the U-shaped cross section.

10. The removable roof according to claim 1, wherein the fixed body structure is a roll bar device.

11. The removable roof according to claim 2, wherein the bracing elements are held on the roof elements.

12. The removable roof according to claim 11, wherein each bracing element is constructed as a bolt and is fastened on a holder of one of the roof elements.

13. The removable roof according to claim 12, wherein the holder on which the bolt is fastened has a U-shaped cross section with segments which are held on the one of the roof elements.

14. The removable roof according to claim 13, wherein a bar of the U-shaped cross section of the holder accommodates the bolt.

15. The removable roof according to claim 12, wherein the bolt is adjustable in an axial direction.

16. The removable roof according to claim 14, wherein the bolt includes a type of thread on its exterior by which the bolt can be screwed into a bore hole in the bar of the U-shaped cross section.

17. The removable roof according to claim 10, wherein the bracing elements are held on the roof elements.

18. The removable roof according to claim 3, wherein the bracing elements are held on the roof elements.

19. The removable roof according to claim 7, wherein the bolt is adjustable in an axial direction.

20. The removable roof according claim 8, wherein the bolt includes a type of thread on its exterior by which the bolt can be screwed into a bore hole in the bar of the U-shaped cross section.

* * * * *